May 1, 1951 W. E. GUSTAFSON 2,550,689
WIDE RANGE HIGH-FREQUENCY POWER METER
Filed Dec. 11, 1946 2 Sheets-Sheet 1
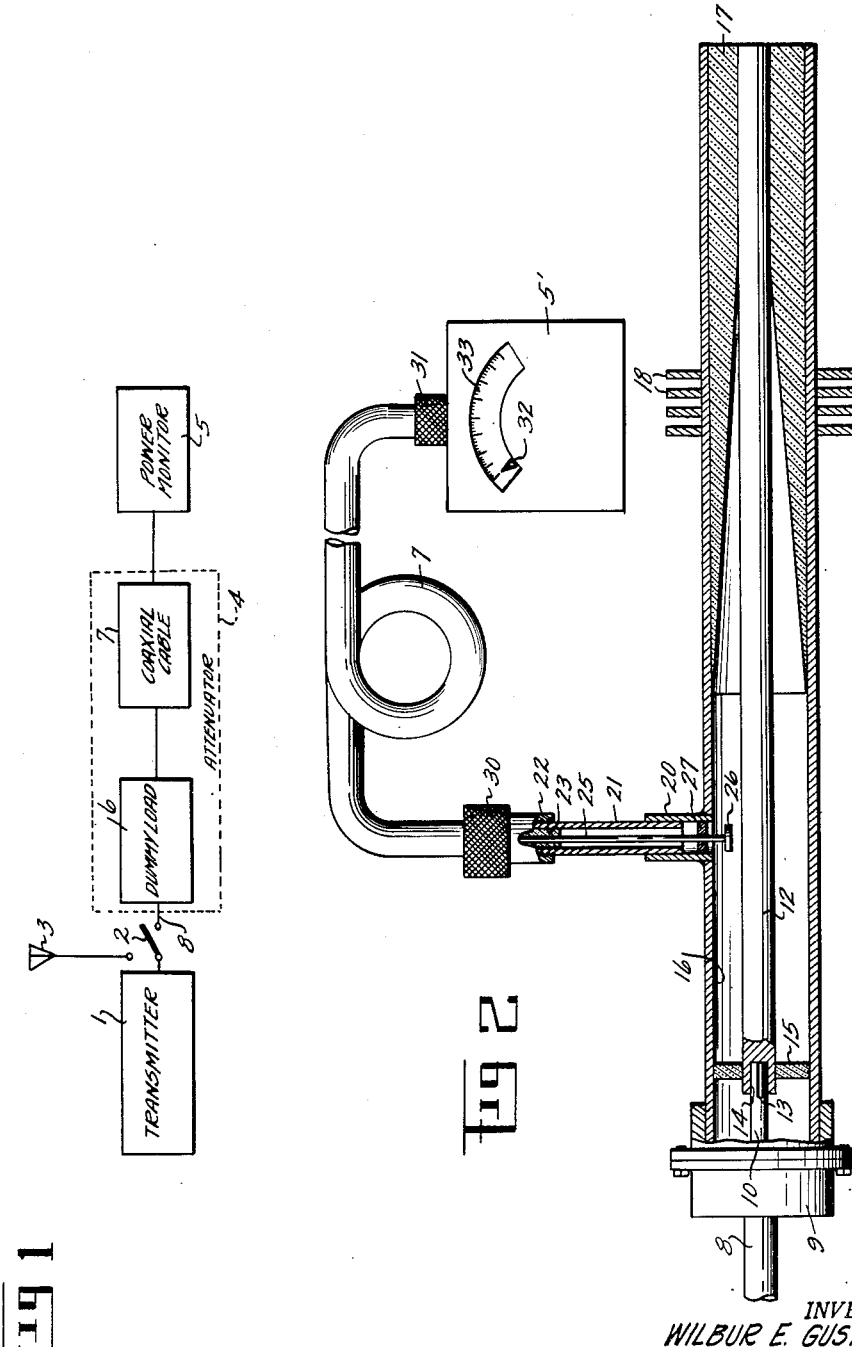
INVENTOR.
WILBUR E. GUSTAFSON

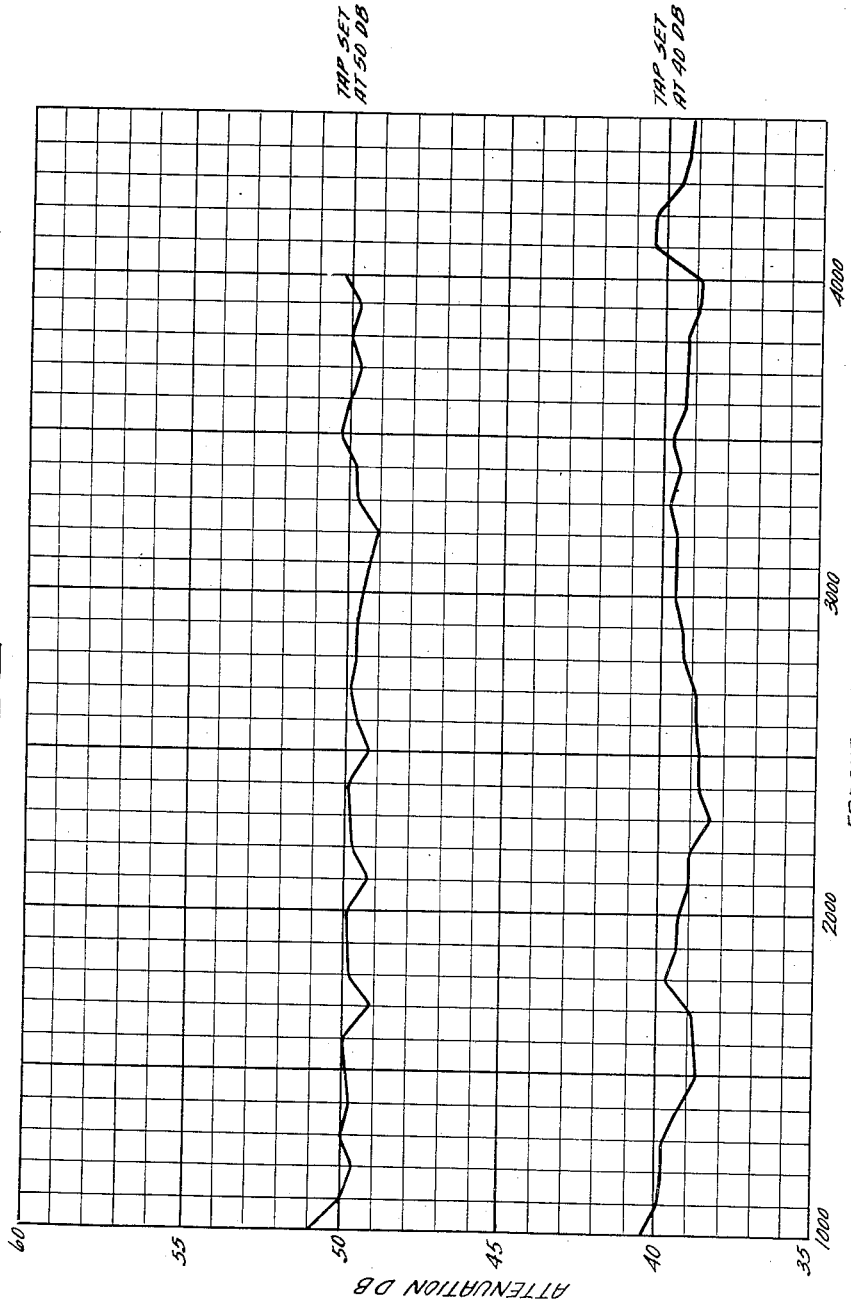

Patented May 1, 1951

2,550,689

UNITED STATES PATENT OFFICE 2,550,689

WIDE RANGE HIGH-FREQUENCY POWER METER

Wilbur E. Gustafson, San Diego, Calif.

Application December 11, 1946, Serial No. 715,597

2 Claims. (Cl. 171—95)

(Granted under the act of March 3, 1883, as amended April 30, 1928; 370 O. G. 757)

The invention described herein may be manufactured and used by or for the Government for governmental purposes without payment to me of any royalty thereon.

This invention relates to electric power measuring means and more particularly to a wide range, high frequency power meter means and a method for measuring the high frequency power output of a radio signal generator, transmitter or the like substantially independently of its frequency.

In the past the measurement of the power output of a radio transmitter producing radio energy in the higher frequencies has been commonly by intercepting the radio energy after it has been radiated from an antenna connected with the transmitter or by applying the output from the transmitter to a dummy load and through a thermocouple in series with the load to a millivoltmeter. Measurements so obtained have been undesirably erratic and inaccurate.

An object of the present invention is to provide an electric power measuring instrument that receives its input directly from a source of power and that, within limitations, is substantially independent of the frequency at which the power is supplied to the instrument.

Another object is to provide a means and a method for the direct measurement of electrical power output in a high frequency range with reproducible accuracy.

A further object is to provide a practical and simply operable instrument for the measurement of high frequency electric power and that employs parts that are readily obtainable and that can be accurately calibrated.

With the above and other objects in view that will be apparent to those who are informed in the field of electronics from the hereinafter described method of making determinations and from the following description of an illustrative instrument that is shown in the accompanying drawings, in which:

Fig. 1 is a circuit block diagram of the instrument removably connected to a usual form of high frequency power source;

Fig. 2 is an enlarged fragmentary view partly in section of the instrument part of the circuit that is shown in Fig. 1; and Fig. 3 is a graph showing experimental curves of frequency plotted against attenuation and indicating the precision of the instrument.

In the accompanying drawing, high frequency electrical power is supplied from any suitable source, such as a signal generator or transmitter 1 for example, from which the power, as radio energy, would normally be radiated through a switch 2 from a transmitting antenna 3.

An instrument that embodies the present invention is shown releasably connectable through the switch 2 directly to the transmitter 1. The instrument essentially comprises an attenuator 4 and power monitor 5. The attenuator 4 attenuates the output from the transmitter 1 to a linear value that is substantially independent of frequency and that decreases the magnitude of the power output from the transmitter 1 sufficiently so that it may be applied safely to the power monitor 5.

The attenuator 4 preferably converts the power output from the transmitter 1 into a substantially constant voltage, absorbs the bulk of that power, taps off a small fraction of that power and attenuates the fraction of power so tapped off so that it may be safely applied to the power monitor 5. The illustrative attenuator 4 that is disclosed herein comprises a dummy load 6 and a predetermined length of attenuating coaxial cable 7. The dummy load 6 receives its power input through a connecting cable or connector 8 that is releasably connected through the switch 2 with the power source or transmitter 1.

An illustrative dummy load is shown in longitudinal section as a part of Fig. 2 in the accompanying drawing. The dummy load there shown is a taper terminated, non-resonant, coaxial lossy line that absorbs the power output from the transmitter 1 and that serves as a phantom antenna. The power output from the transmitter 1 passes through switch 2 to a preferably cable connector 8. The connector 8 is joined in a usual manner, as by a radio frequency jack 9 or the like, to a power absorbing section of coaxial line. The inner contact 10 of the jack 9 is connected at one end to one conductor of the cable connector 8 and at the other end to the inner or center conductor 12 of the coaxial line, as by having its ends on either side of a slot 13 spread to fit snugly within a socket 14 in the fed end of the center conductor 12 of the coaxial line. The other conductor of the connector 8 is connected through the jack 9 to the outer conductor 16 of the coaxial line, the outer conductor 16 of the coaxial line being grounded in this circuit.

In the coaxial line a bead 15 of polystyrene or other suitable insulator maintains the fed end of the center conductor 12 substantially concentric of the outer conductor 16. The center conductor 12 extends coaxially of the outer conductor 16 in usual manner. The opposite or terminal end of the center conductor 12 is similarly maintained coaxially of the outer conductor 16 by a dummy load of suitable power absorbing dielectric material 17 that is interposed therebetween.

The power absorbing dielectric material 17 preferably continues in contact with the center conductor 12 for a suitable distance, or over a suitable bearing surface to provide a predetermined quantity of dielectric material 17 therebetween and to maintain the center conductor 12 and outer conductor 16 in stable mechanical coaxial relation with respect to each other. The dielectric material 17 tapers gradually forwardly from this zone of contact with the inner conductor 12 radially outwardly therefrom toward the outer conductor 16, substantially as shown in the drawing, so that the line is terminated in its characteristic impedance and hence has no standing waves upon it. All energy passing down the coaxial line so terminated is absorbed at the terminus so that there is no reflection at this point. The dielectric material 17 is a suitable cement with flake graphite mixed substantially uniformly through it in an illustrative proportion by weight of 40 and 60 per cent, respectively, that is molded into place as a paste and is then solidified by baking. The resultant assembly provides a preferably 50 ohm characteristic impedance line with a tapered lossy dielectric. The outer conductor 16 preferably is provided with a desired plurality of heat interchanging fins 18 that project radially from its outer surface for the purpose of dissipating the heat from the coaxial line when power of high wattage is applied thereto.

One or a desired plurality of probe pick-up assemblies are located between the input end of the coaxial line load and the beginning of the tapered dielectric material 17, in any desired manner, for tapping off power therefrom. Between the zero or thin forward edge of the power absorbing dielectric material 17 and the end of the center conductor 12 that contains the socket 14, the outer conductor 16 is tapped in one, as shown, or in a desired plurality of positions to receive a corresponding number of collars 20 that are press fit, welded or are otherwise secured at their radial inner ends to the outer conductor 16 so that they are immovable with respect thereto. In each of these positions, a hollow cylindrical tube 21 fits within and is adapted to make sliding engagement axially of the collar 20. The tube 21 at its radially outer end is secured within an externally threaded connector 22 that threads into an internally threaded fitting connector 30 of a usual coaxial line fitting that joins the probe pick-up assembly with a predetermined length of attenuating coaxial cable 7.

Within, and as a part of each of the probe pick-up assemblies, a probe pick-up 25 is disposed to extend into the coaxial line between the input end of the load and the beginning of the tapered dielectric material 17. The probe pick-up 25 serves as a radio frequency connector when so put on the dummy load 6 at the end where the dielectric material 17 tapers to zero. The probe pick-up 25 is mounted in any desired manner so that it can be moved into and out of the field in the coaxial load, such as by having its upper end firmly mounted within the fitting connector 22 with insulating material 23 interposed therebetween.

The probe pick-up 25 extends axially of the tube 21 and collar 20 and preferably terminates downwardly in a disc 26. A resistance is introduced between the probe pick-up 25 and the grounded outer conductor 16 that is very near to the capacity section of the probe pick-up 25, such as the disc resistor 27 or the like. The disc resistor 27 is firmly mounted within the collar 20 and is apertured centrally for making electrical connection with the probe pick-up 25 and for the sliding of the probe pick-up 25 therethrough.

When so assembled, the probe pick-up 25 is adapted for being adjusted in the electrical relation between its disc 26 and the coaxial line inner conductor 12 as by causing the tube 21 to be moved axially within the rigidly secured collar 20. The resistor 27 sets the internal impedance of the pick-up section preferably to very nearly 50 ohms over a wide band of frequencies in an illustrative experimental model that is referred to hereinafter. The upper end of the probe pick-up 25 is adapted for being engaged in any usual manner, not shown, with the inner conductor of the coaxial cable 7. The outer conductor of the coaxial cable 7 is connected electrically through the fitting connectors 30 and 22 and the tube 21 and collar 20 with the grounded outer conductor 16 of the coaxial line.

The coaxial cable 7 is of a predetermined length depending upon the amount of attenuation that it is to introduce into the circuit. The end of the coaxial cable 7 that is remote from the fitting connectors 30 and 22 is connected through a similar connecting fitting 31 with a suitable power monitor, such as the monitor power meter 5' or the like. The monitor power meter 5' preferably is of a direct reading type, readings being obtained from the position of a movable hand 32 upon a fixed scale 33. In experimental work, a monitor power meter 5' reading up to two milliwatts full scale has been found to be adequate for low power readings.

The power output from the transmitter 1 is substantially completely absorbed by the attenuation of the coaxial line looking into its input end. The attenuation of the probe pick-up 25 is inversely proportional to an increase in the frequency of the power output from the transmitter 1. The attenuation of the coaxial cable 7 increases directly with increase in frequency of the power that is impressed upon it. The length of the coaxial cable 7 is such that its attenuation counterbalances the attenuation of the probe pick-up 25 to provide for the instrument an overall attenuation curve that is substantially flat and an attenuation that is substantially independent of the frequency of the power output from the transmitter 1. The impedance of the coaxial cable 7, looking into the coaxial cable from its output end or toward the disc resistor 27, is of smaller magnitude than, but is of similar taper when compared with the impedance of the coaxial line comprising the center conductor 12 and outer conductor 16, looking into its input end and toward the power absorbing dielectric material 17. The tapered resistor or dummy load 6 is selected to have a substantially low variable standing wave ratio so that the probe pick-up 25 will be measuring the power at a representative point and not at a maximum or minimum value.

The adjustment of the probe pick-up 25, as its disc 26 is moved toward the inner conductor 12 decreases the attenuation of the attenuator 4. The adjustment of the probe pick-up 25 so that its disc 26 is moved away from the inner conductor 12 increases the attenuation of the attenuator 4. The adjustment of the probe pick-up 25 with respect to the inner conductor 12 alters the attenuation of the attenuator 4 in a manner that is linear with power. Voltage distribution between the coaxial line inner conductor 12 and the outer conductor 16 is logarithmic since the voltage increases in logarithmic fashion and the power increases in linear fashion as the probe is pressed in toward the inner conductor 12.

For these reasons, a plurality of probe pick-up assemblies mounted to extend radially away from the coaxial line outer conductor 16 and located between the input end of the load and the beginning of the tapered dielectric 17 provides an instrument for measuring a relatively wide range of attenuation substantially irrespective of frequency where the different probe discs 26 are disposed at different positions with respect to the inner conductor 12 of the coaxial line. If the position of one probe disc 26 with respect to the coaxial line inner conductor 12 be taken as a reference position, another probe disc 26 that is pressed in closer toward the inner conductor 12 will have a lower impedance than the reference probe, which is the condition for lower power reading on the monitor meter 5'. A third probe pick-up that has its disc 26 further away from the coaxial line inner conductor 12 than the reference probe disc will have a higher impedance than the reference probe and can be used for measuring higher values of power than can either of the other two probes. Where three probes are used they preferably may be mounted along a common circumference of the coaxial line outer conductor 16 and substantially at an angle of 120° with respect to each other. Preferably, two or three probe pick-up assemblies, with the attenuation of each set approximately eight decibels apart are used so that different power ranges can be obtained by selecting the proper proble.

As an example, one probe pick-up assembly could be adjusted so that the total attenuation of the system of connecting cables and probe may be 40 decibels; a second probe pick-up assembly could be adjusted so that the total attenuation of that assembly would be 48 decibels; and a third probe pick-up assembly could be adjusted so that its total attenuation would be 56 decibels. With this arrangement a wide range high frequency power meter is provided through the exercise of the present invention, using monitor power meter 5' having a 12 milliwatt full scale range. The first probe pick-up assembly would give 20 watts scale, the second probe pick-up assembly would give 120 watts full scale and the third probe pick-up assembly would give 800 watts full scale.

Preferably the impedance of the probe pick-up 25 is maintained rather high so that the effect of any standing wave which might be introduced into the coaxial line by the presence of the probe therein as a reactive component will be minimized. Even though the load may eliminate the standing wave normally in the line, the presence of the probe in the line may produce a standing wave. As previously stated, the line terminated in the load preferably has a substantially flat voltage characteristic. Unless the probe impedance is quite high, it may result in a mismatch and may influence the voltage on the line.

The dummy load 6 is tapered to provide a good variable standing wave ratio down to 1000 megacycles. The probe pick-up assembly may be set at approximately 26–36 decibels at 3000 megacycles. The assembly will then have a frequency correction of approximately 12 decibels within the frequency range of from 1000 to 4000 megacycles, the attenuation decreasing with increase in frequency. A proper predetermined length of cable 7 further attenuates the power and also corrects for the variation of attenuation with frequency that is inherent in the probe pick-up.

With the proper selection of the length of the cable 7, the total attenuation of the probe and attenuatior system can be held very flat within the frequency range between 1000 and 4000 megacycles as indicated by the actual experimental curves shown in Fig. 3 of the drawings. Where two probe pick-up assemblies on the dummy load were used, two power ranges were obtained in the order of 50 and 500 watts full scale. The broad band matching section provided by the device reads power within a reproducible accuracy range of from 10 to 15 per cent over the cited frequency range of from 1000 to 4000 megacycles.

It was determined experimentally that the disc resistor 27, acting as a load resistor of 50 ohms when used with a coaxial cable 7 having a characteristic impedance of 50 ohms and designated commercially by the symbol RG—21—U and 20 feet in length, provided a substantially constant attenuation with changing frequency over the frequency range from 1000 to 4000 megacycles. Where the power absorbing dielectric material 17 in the tapered resistor had a resistance of 50 ohms, a substantially constant voltage instead of a standing wave was obtained within the coaxial line where 20 feet of coaxial cable 7 of characteristic impedance of 50 ohms was used and a disc resistor 27 of 50 ohms was used for matching.

Operatively the power from the transmitter 1 is fed through the connecting cable 8 to the coaxial line part of the dummy load 6 where it is dissipated by the dielectric material 17. The probe pick-up 25 takes a small amount of energy from the transmission line with the attenuation of the attenuator 4 varying in a manner that is linear with power, depending upon the proximity of the probe pick-up disc 26 to the coaxial line inner conductor 12. The level of the energy that is extracted by the probe pick-up 25 from the coaxial line is determined by the nearness of the probe pick-up disc 26 to the field between the center conductor 12 and the outer conductor 16 of the transmission line. The dummy load 6 must present a reasonably low variable standing wave ratio in order that the probe pick-up 25 will be measuring the power at a representative point rather than at a maximum or minimum point in a system with a large difference in maximum and minimum.

The energy picked up by the probe pick-up 25 is fed through the coaxial cable 7, which further attenuates the power so picked up before it reaches the actual power measuring bridge or monitor power meter 5' from which readings indicating the power output of the transmitter 1 over the frequency range of from 1000 to 4000 megacycles are taken.

he monitor power meter 5' used as a part of the experimental model referred to herein measured two milliwatts of power full scale and had but one scale reading. A total of 40 or 50 decibels attenuation in the circuit was required therefore to properly measure the power output of the radio transmitter operating over the designated range.

Variable standing wave ratio measurements made upon a plurality of power meters reading in milliwatts for use as the monitor power meter 5' indicated that substantially all points had a standing wave ratio of 2 to 1 or less over the frequency range between 1000 and 4000 megacycles. The accuracy from these determinations was plus or minus five per cent of power or better if an average correction of minus five per cent is assumed with the power that is reflected from the terminus of the transmission line. The dummy load therefore absorbs about 95 per cent of the power applied to the transmission line. For these reasons each milliwatt power meter that is to be used as the monitor 5' should be checked for variable standing wave ratio over the designated frequency band before being installed for use in the present device.

Since a probe type pick-up has a frequency correction factor of approximately 12 decibels over the designated frequency range, a two milliwatt monitor power meter 5' is not adapted for being used with all of the attenuation in the probe pick-up 25. Currently available standard attenuators are not adapted for use in the disclosed device since they have either a fixed attenuation with varying frequency or an attenuation characteristic which does not compensate for the correction factor of the probe pick-up 25. The attenuation correction factor that was introduced into the cited experimental device by 20 feet of coaxial cable 7 compensated with a reasonable degree of accuracy for the correction factor of the probe pick-up 25 with the values of the other components in the circuit of the experimental device as stated. The total attenuation in the experimental device cited herein was found to be practically free from correction over the designated range.

It was determined further experimentally that 20 feet of attenuated cable 7 could be used to correct for the change in attenuation of the probe pick-up 25 as the power frequency is varied. This length of cable applies substantially in general because the frequency correction for the probe pick-up 25 is the same regardless of the attenuation level that it is set for in the absence of standing waves set up by the load. Where each of a plurality of probe pick-ups 25 is at a different distance from the lossy dielectric portion 17 of the load, the different probe plates 26 will be at different positions upon or at a different portion of any standing wave in the coaxial line. Where the dummy load 6 can be made to have a variable standing wave ratio of 1.15 to 1 or less, there is no practical necessity for a frequency correction factor for each of the various probes.

A calibration of the cited experimental device over the designated frequency range of from 1000 to 4000 megacycles was made for determining whether or not the total attenuation of the experimental device was constant over this frequency range.

In calibrating the attenuation of the present wide range high frequency power meter model, a 50 ohm series resistor was introduced after a signal generator representing the transmitter 1 in the drawing and ahead of 10 feet of attenuating cable that is commonly designated as RG—38—U at the input end of the device. Another 10 feet of the RG—38—U cable was connected to the output of the device and fed into the input of a mixer in a radio receiver circuit. The series resistor and the two lengths of RG—38—U cable were used as padding to minimize any resonant effect.

With this arrangement, a signal of 1000 megacycles was used and the level of 100 was set on the radio receiver diode meter with the step attenuator of the radio receiver set on zero and with the signal tuned for a maximum by means of the mixer in the radio receiver. The device was then removed from the circuit and the two sections of RG—38—U cable were connected together. With this arrangement, the signal had the same attenuation as before except that the wide range high frequency power meter was not in the circuit. The step attenuator of the radio receiver was then set to give approximately 100 reading on its diode meter. Where this reading was exactly 100, then the attenuation of the device could be obtained from a predetermined attenuation curve for the radio signal generator and receivers that had been used as reference. If the readings were not exactly at 100, the decibels difference was calculated by the voltage ratio as indicated upon the diode meter and the difference was added or subtracted from the figure obtained from the attenuation curve. This procedure was repeated for each 100 megacycles from 1000 to 4000 megacycles and the results were plotted to provide the curves that are shown in Fig. 3 of the accompanying drawings.

It will be apparent upon an inspection of these curves that the attenuation of the probes set at 40 decibels and at 50 decibels attenuation was flat within plus or minus 1 decibel over the frequency range tested. It is believed that plus or minus ½ decibel is the probable error in the attenuation measurements since some of the fluctuations in the curves may be due to measurement errors rather than to actual changes in attenuation. This belief was substantiated in part by running control tests based upon calorimetric methods of determining power measurement. Sources of error in the use of the present device may rise from resonant effects in the generator output circuit or in the input circuit of the mixer in the radio receiver with which the device may be connected in the making of attenuation measurements. The use of padding at each end of the circuit of the present device and of a series resistance adjacent the generator at the input end of the present device as recited in the description of the calibration of the experimental model is believed to substantially overcome these sources of error.

Frequency modulation in the output from the signal generator 1 may cause errors in measurement due to slight changes in the intermediate frequency characteristics of the radio receiver with which the present device may be connected when the step attenuator is changed. This will cause apparent differences in gain between a signal of no frequency modulation and a signal with one or two megacycles of frequency modulation. It is preferred therefore that the attenuation curve during the calibration of the present device be made against a signal generator that has practically no frequency modulation. It has been found that attenuation measurements made with a signal generator having considerable frequency modulation during calibration of the present instrument are more subject to error than where this frequency modulation is not present. Error can be further avoided by properly tracking the oscillator in the radio receiver with which the device is used since error is introduced by having too small a signal from the local oscillator in the mixer circuit of the receiver because too small a signal causes the output of the mixer circuit to be dependent upon both the input signal level and the local oscillator signal level.

In the further avoidance of error, it is advisable to match the power measuring loads to the oscillator in the radio receiver with which the present device is used since otherwise the oscillator will actually put out different amounts of power for the same input power conditions.

It is to be understood that the device that has been shown in the accompanying drawings and described has been submitted for the purpose of illustrating and describing an illustrative embodiment of the present invention and that limited changes and modifications may be made in the components thereof and in their arrangement without departing from the scope of the present invention.

What I claim is:

1. The method of measuring the electromotive force of high frequency power, comprising the steps of adjustably tapping off a part of the electromotive force, attenuating the tapped off part of the electro-motive force in one order, attenuating the tapped off part of the electromotive force in an inverse order to counterbalance the earlier attenuation thereof, and measuring the resultant part of the electromotive force.

2. A power meter for indicating electrical power at high frequencies inclusive of the range between 1,000 and 4,000 megacycles, comprising a coaxial transmission line having outer and inner conductors to which power may be applied, means conducting power to said coaxial line, a probe pick-up adjustably insertable into said coaxial line for tapping off a fraction of the applied power and having an attenuation inversely proportional to an increase in the frequency of the applied power, resistor means between said probe pick-up and the outer conductor of said coaxial line, a coaxial cable attenuator means receiving the output from said probe pick-up and having an attenuation directly proportional to an increase in the frequency of power input to said coaxial line, and voltage monitor means receiving the output from said coaxial cable and indicating the magnitude of the applied power substantially irrespective of the frequency thereof.

WILBUR E. GUSTAFSON.

REFERENCES CITED

The following references are of record in the file of this patent:

UNITED STATES PATENTS

| Number | Name | Date |
| --- | --- | --- |
| 1,999,250 | Mollath et al. | Apr. 30, 1935 |
| 2,273,547 | Von Radinger | Feb. 17, 1942 |
| 2,401,205 | Usselman | May 28, 1946 |
| 2,404,797 | Hansen | July 20, 1946 |
| 2,407,690 | Southworth | Sept. 17, 1946 |
| 2,409,599 | Tiley | Oct. 15, 1946 |
| 2,438,915 | Hansen | Apr. 6, 1948 |
| 2,443,637 | Ovrebo | June 22, 1948 |
| 2,443,921 | Moe | June 22, 1948 |
| 2,494,722 | Rosen | Jan. 17, 1950 |